July 1, 1969     D. A. KELLY     3,452,725

HIGH COMPRESSION ROTARY I.C. ENGINE

Filed Aug. 23, 1967

INVENTOR.
Donald A Kelly

July 1, 1969 D. A. KELLY 3,452,725
HIGH COMPRESSION ROTARY I.C. ENGINE
Filed Aug. 23, 1967 Sheet 3 of 4

INVENTOR.
Donald A. Kelly

# United States Patent Office 3,452,725
Patented July 1, 1969

3,452,725
HIGH COMPRESSION ROTARY I.C. ENGINE
Donald A. Kelly, 58—06 69th Place,
Maspeth, N.Y. 11378
Filed Aug. 23, 1967, Ser. No. 662,786
Int. Cl. F02b 53/12, 55/08
U.S. Cl. 123—16
7 Claims

ABSTRACT OF THE DISCLOSURE

A rotary internal combustion engine consisting of a cylindrical outer housing with a special shaped stator cavity which provides a maximum compression ratio, multiple free floating vanes, and a lubrication liner to provide adequate lubrication from the double-lip seal assemblies.

The outer housing is fitted with multiple spark plugs at the combustion cavity to provide more complete combustion and efficiency and thereby lower the toxic level of the exhaust in support of anti-air pollution programs.

---

This invention relates to a rotary internal combustion engine of the eccentric rotor and multiple free-vane type. Several engines of this type have been developed and tested with varying degrees of success. This type of rotary engine is attractive for many applications since it is basically simple from both a manufacturing and maintenance standpoint.

Since this type of rotary engine does not utilize a multiple-lobed rotor and eccentric output drive arrangement it is therefore somewhat simpler than the Wankel engine in this respect.

The major problems encountered in all rotary engine designs are adequate compression ratio, effective long-life sealing, efficient lubrication and maintaining reasonable wear in the running parts, usually in this respective order of importance.

The importance of the rotary compression ratio is quite obvious since it will be the key to the replacement of the reciprocating I.C. engines by the rotaries, which will eventually come about as the demand for higher power-to-weight ratio engines becomes more necessary for many applications.

The difficult problem of seal design for minimum wear is all important since it relates to the high compression ratios necessary and the demand for long-life, maintenance-free operation. Efficient lubrication is part of the overall sealing problem since effective long-life sealing will require a dependable oil film at the sealing surfaces to keep the coefficient of friction low at the seal lips traveling over these surfaces at high peripheral speeds.

The high combustion temperature generated at the upper engine half must not break down the oil film surfaces in this area.

Cooling will be a contingent consideration for many high speed rotary designs since the high rate of frictional and combustion heat must be quickly transferred to the cooling medium. Effective intake and exhaust porting no longer appear to present a difficulty since experience has shown that axial intake ports and tangential multiple exhaust ports provide an effective arrangement.

This type of I.C. rotary engine is generally similar to the centrifugal gas turbine in operation since both are directly driven by an ignited and expanding gas force acting along the periphery of a vaned rotor.

The main difference between this type of rotary I.C. engine and the centrifugal turbine is that the rotary engine vanes are pressure sealed and are subject to higher compression ratios while the turbine is free spinning at lower comparative pressure ratios.

This difference between the two engine types leads to specific operating characteristics wherein the free turbine operates at higher speeds and consumes fuel at a relatively high rate, while the I.C. rotary runs at lower speeds and thereby consumes fuel at a lower rate.

Rotary engines of this type should effectively fill the application spectrum between the latest gas turbines and the reciprocating I.C. and C.I. engines.

A thorough effort must be made in rotary I.C. engine design to achieve complete combustion within the compressed instant cavity in order to lower the toxic level of the engine's exhaust to support the current anti-air pollution programs.

It has been establisehd that I.C. engines contribute the greater percentage of pollution to the air from all known sources.

The rotary engine offers a means of providing this feature of complete combustion due to its relatively large combustion area. An arrangement of multiple spark plugs at the optimum combustion area should prove effective in providing this requirement.

The high compression ratio feature of this engine design is obtained by combining basic geometric stator shapes and placing the rotor at an advantageous position within the stator. The object of the resultant stator shape is to start with as much intake volume as possible and reduce this to a minimum volume within 180 degrees of rotation. The combustion and expansion sector volume should provide a gradual uniform increasing volume to stretch out the power thrusts over 150 degrees or nearly so. The nominal 30° balance is assigned to the tangential exhaust phase.

The various advantageous stator shapes can be, first a combined half-elliptical and half-circular shape, another would be a half-elliptical and half-egg shape, a full ellipse with the rotor placed at one end of the major axis, and an oblong stator with the rotor in one upper quadrant.

The limiting factor in the stator shape is the requirement that the vanes not leave their rotor slots by more than three-fourths their height, so there is no possibility of the vanes cocking in their slots during their radial displacement. Since sealing and seal design is a major consideration the choice of seal configuration should be based on decreasing the centrifugal load and increasing the surface contact area of each seal. The adoption of a double lip or Y seal seems advantageous because the shallow angle of each lip will provide a baffling effect and positive sealing for each vane. The opposing lips on an adjacent pair of vanes will insure a pressure tight cavity. The seal lip angle must be shallow so that during combustion no unduly high radial component load is imposed on the seal lips. The increased seal contact area should increase the wear life of the seal when proper lubrication is present.

Variations of the Y seal configuration may consist of the Y lips being made part of the vane with a conventional rectangular sealing strip being closely fitted in center slots of the vanes. The seals must extend completely around three sides of each vane to effect a complete pressure seal, from the intake angle to the completed combustion angle. The multiple slots of the rotor may be provided with V grooves along their length to allow the Y seals to completely retract flush with the periphery of the rotor.

The vane Y seals may be made of one piece or more conveniently made up of three pieces consisting of one end seal section and two identical side seal pieces. Due to the Y configuration the ends must be mitered (at 45°) since end half-lapping is not practical. The mitered end joints must be sealed with an L shaped flat splice piece to effect a complete seal. The accompanying drawings will show the miter joint and splice piece in detailed clarity.

The seal sections will be bonded into the corresponding slots in the vanes and carefully checked for end and side clearance within the stator cavity. No springs are required behind the seals due to the vanes being independently free to move to any radial position within the stator cavity. Double seals may be utilized in conjunction with the integral Y lip wide vanes in place of single rectangular seal strips, for certain high power applications. The double seals would provide adidtional surface sealing area since the integral Y vane lips do not touch the cylinder wall at any rotational position.

The nominal clearance between the Y lip ends and the cylinder wall should be about .010±.005 for maximum effectiveness.

It may also be possible to add sealing rods of filled-Teflon or Viton between the rectangular sealing strips on the inside of the integral Y lips to provide additional free-floating sealing at the vane ends and sides.

The integral Y lips on the vanes has the advantage of ruggedness and provides protection for the centered rectangular sealing strips during their high high speed contact with the cylinder wall. By keeping the lip and wall clearance close a great percentage of the combustion surge pressure is relieved from the sealing strips which will promote longer operating life for them. Other variations and combinations may be employed to gain more effective sealing within the volume of the integral Y lips. The material for the rectangular sealing strips may be filled-Teflon or Viton which exhibit low frictional coefficients and relatively long life. Other sealing materials may be chosen for certain specific applications where higher compression ratios are necessary.

The multiple independent vanes are set in close fitting slots in the rotor and thereby guided in their radial displacement when the rotor revolves. The depth of the rotor slots is based on the vane and Y seals being fully retracted into them at the top vertical position with a minimum bottom vane clearance.

A uniform oil film lubrication system would be realized by utilizing a porous liner bonded to the inner cylinder wall. The liner would retain a reservoir of light lubrication oil with an oil film formed on the working surface of the liner. The oil would be supplied externally through a manifold system which enters the cylinder wall at the bottom sector and uniformly distributed to the liner by equally spaced shallow grooves located in the cylinder inside wall. By this method the oil is brought into the cylinder at the low pressure area and then uniformly distributed behind the liner so that all points on the liner receive oil flow independent of variations in pressure due to the compression and combustion phases.

The oil film is continually wiped from the liner by the revolving seals lowering the frictional level in the process with new oil replacing this in a continual operation. Oil is burned off in this method in a similar manner to that of a two cycle engine. An external reservoir would constantly supply oil under light pressure which would have a filler means and a capacity gauge similar to that of the standard I.C. fuel system.

A combined lubrication system would consist of lubricating oil mixed with the fuel in the manner of two cycle I.C. engines, along with the above described method. The combination system may be adopted to gain optimum operating conditions based on seal life and oil and fuel consumption.

Another simple and direct method of seal lubrication may be obtained by supplying an oil flow through a bore in the rear of the main shaft and then to radial holes in the rotor in line with the vane slots. The oil flow would then be forced centrifugally into central radial holes in each vane and then up through the seals. This method may be more economical for oil consumption and would insure oil delivery to the center of the seals at their contact line.

The principal object of the invention is to achieve a simple, high compression ratio rotary internal combustion engine for high power-to-weight ratio applications.

It is an object of the invention to produce a simple rotary engine which is relatively inexpensive to manufacture by applying simple geometric shapes and medium precision components.

It is an important object of the invention to produce a simple rotary engine which achieves nearly complete combustion within the combustion instant cavity in order to greatly reduce the noxious and toxic level of the exhaust gases.

It is an object of the invention to produce a simple rotary engine with a minimum number of working parts for ease of production, replacement and maintenance.

It is an object of the invention to produce a simple rotary engine in which seal wear is minimized by the adoption of shaped seals and baffling devices along with novel lubrication techniques.

Other features and possible variations of the engine design will become apparent from the following description of the high compression rotary engine.

It should be understood that variations may be made in the detail engine design without departing from the spirit and scope of the invention.

Figure 1:
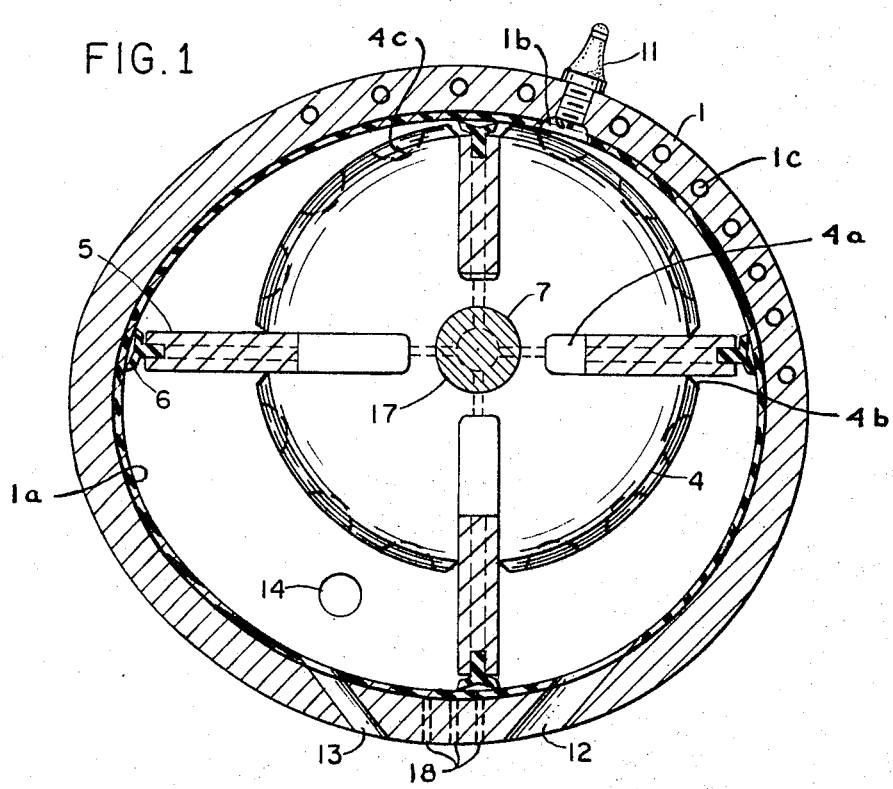
FIGURE 1 is a front sectional view through the half-elliptical, half-circular stator housing, rotor and multiple vanes/seals.
Figure 2:
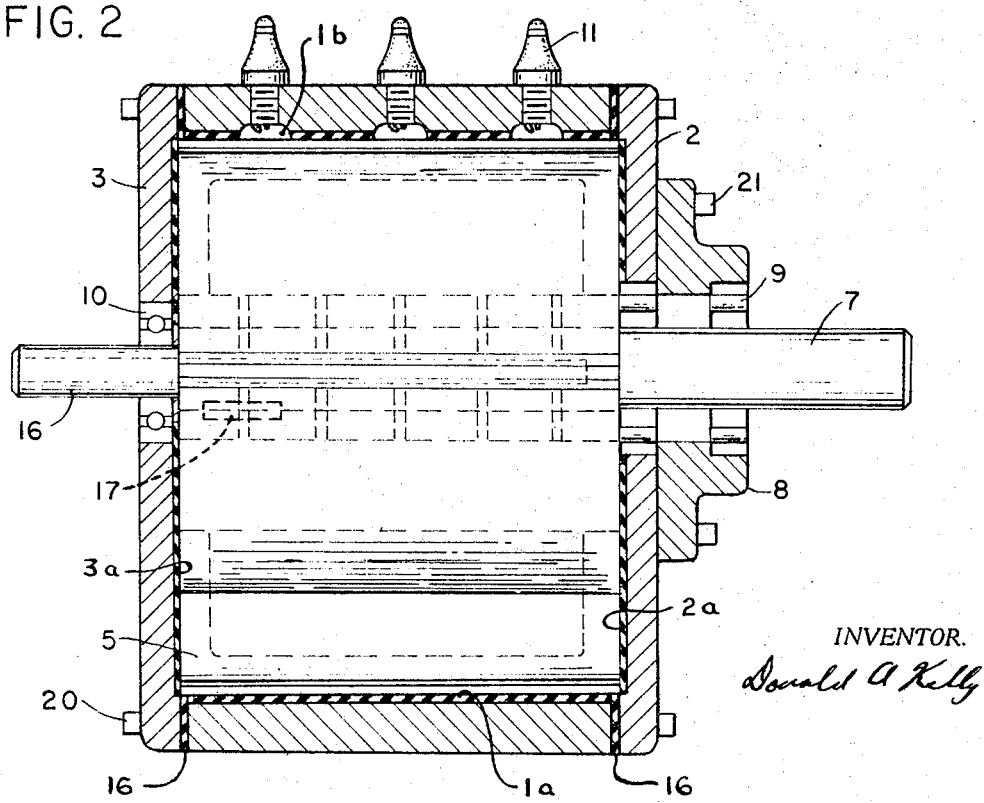
FIGURE 2 is a side sectional view through the engine housing, rotor and multiple vanes.
Figure 3:
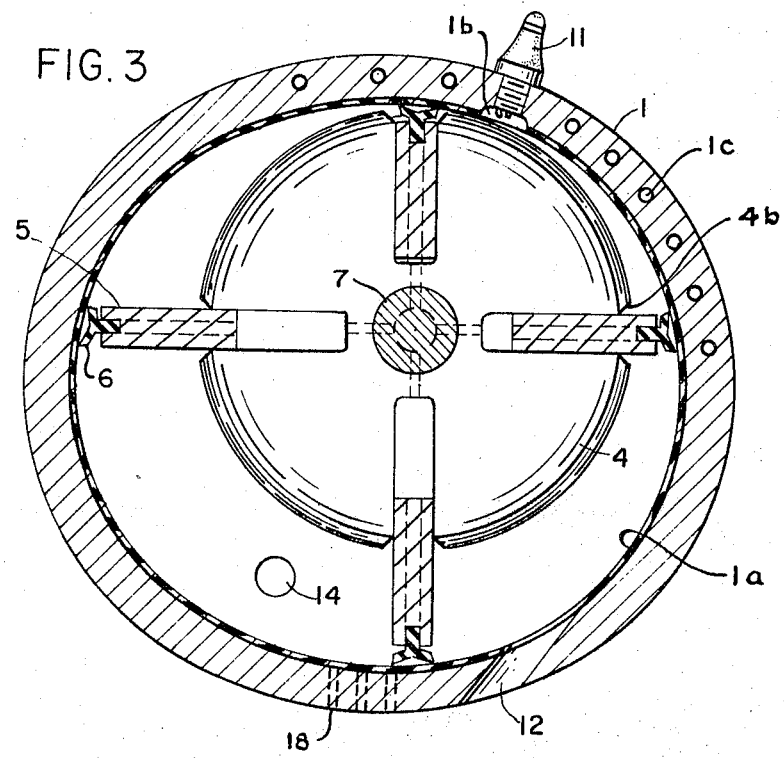
FIGURE 3 is a front sectional view through a half-elliptical, half-modified circular stator housing.
Figure 4:
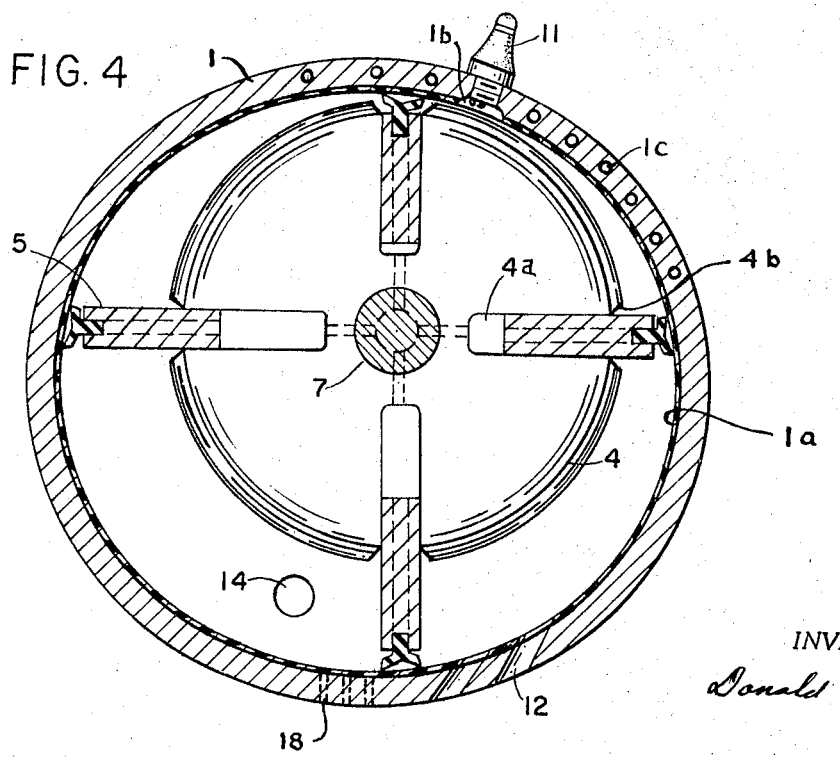
FIGURE 4 is a front sectional view through an oblong stator housing, rotor and vanes.
Figure 5:
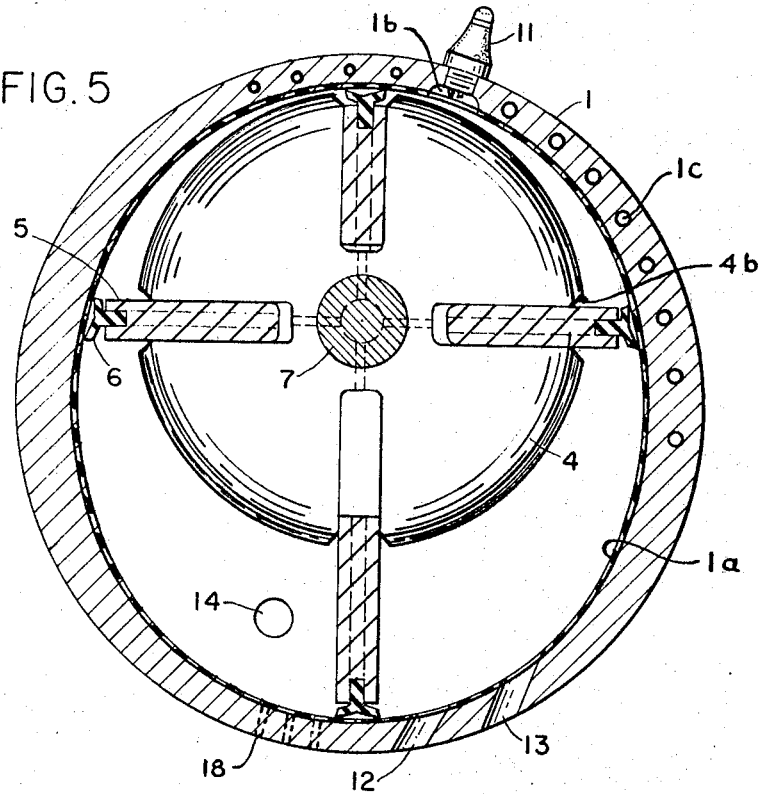
FIGURE 5 is a front sectional view through a vertical elliptical stator housing.
Figure 6:
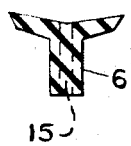
FIGURE 6 is a section through a typical Y seal section.
Figure 7:
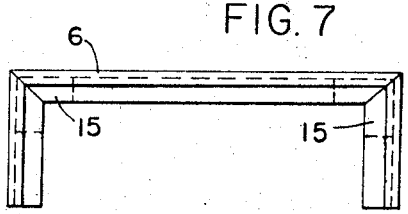
FIGURE 7 is a side view of a complete seal assembly.
Figure 8:
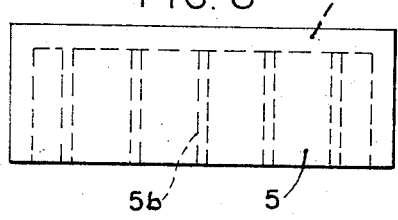
FIGURE 8 is a side view of a typical vane.
Figure 9:
FIGURE 9 is a side view of a flat splice piece.
Figure 10:
FIGURE 10 is an end view of a flat splice piece.
Figure 11:
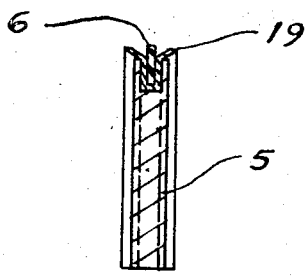
FIGURE 11 is an end sectional view through a vane and a baffling Y strip with a single rectangular sealing strip.
Figure 12:
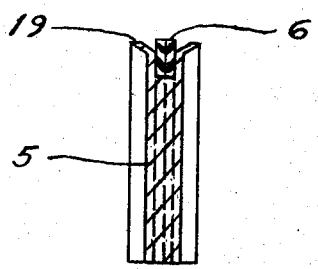
FIGURE 12 is an end section view through an integral vane and Y vane lips with double rectangular seal strip.
Figure 13:
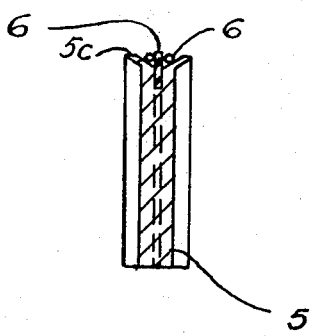
FIGURE 13 is an end section view through an integral vane and Y vane lips, single rectangular seal strip and floating seal rods.
Figure 14:
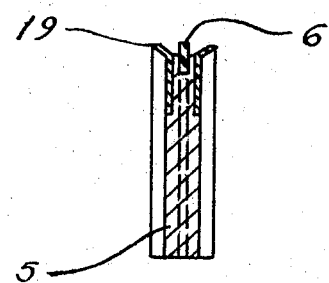
FIGURE 14 is an end section view through a stepped vane and baffling strips riveted in place, single rectangular seal strip.

Referring now in more detail to the accompanying drawings, number 1 is the stator housing with the lubrication liner 1a bonded to the special stator cavity. The two end plates 2 and 3 are secured to the stator housing by the machine screws 20. The gaskets 16 provide a pressure seal between the stator housing 1 and the end plates 2 and 3. The end plates 2 and 3 are fitted with the side lubrication discs 2a and 3a to provide full lubrication for the complete sealing surfaces.

The slotted rotor 4 is offset within the stator cavity and supported by the driveshaft 7. The driveshaft 7 is supported by the roller bearing 9 within the end plate 2 and by the ball bearing 10 within the end plate 3. The front flange 8 is secured to the end plate 2 by the machine screws 21. The other roller bearing 9 is fitted in the front flange 8 to carry the high radial loads. The rectangular key 17 secures the rotor 4 to the shaft 7 both radially and axially.

The multiple vanes 5 are free to move radially within the rotor slots 4a and are closely fitted within them. The vanes 5 are provided with end and side slots 5a which receive the Y seal assemblies 6. The vanes 5 may have lubrication holes 5b uniformly placed along the full width of the vane. The seals 6 are made up of one end piece and two identical side pieces which are mitered at the ends to form a continuous U seal assembly. The mitered joints are sealed with the L splice pieces 15 which thereby provide a continuous seal around the three pieces. The seal assemblies 6 are bonded into the vane slots 5a to insure complete sealing.

The stator housing is provided with the multiple spark plugs 11, which are placed at an angle of about 10 to 15 degrees off top dead center in either direction of rotation as required. The stator cavity and lubrication liner 1a are provided with combustion pockets 1b, which nest the spark plug electrodes and cause the fuel/air mixture to swirl and become turbulent just prior to ignition.

The stator housing 1 has multiple exhaust parts 12 tangentially disposed at the bottom quadrant to carry out the exhaust gases after the power phase of about 140 degrees is complete. Axial intake ports 14 are provided in either or both of the end plates 2 and 3 at the bottom opposite quadrants from the exhaust ports. The intake ports are located approximately 15 to 30 degrees off bottom dead center in the direction of rotation. Intake ports 13 may be tangentially located within the stator housing for priming or supercharging purposes, but are not normally used during engine running.

The stator housing 1 may be provided with multiple oil supply holes 18 which supply lubrication oil from an exterior oil reservoir to the lubrication liner 1a.

The multiple vanes 5 may be made with integral Y lips 5c for certain engine designs. A separate Y strip 19 may be made and bonded into the vane slot 5a if simple vane machining is required. For certain wide Y seal 6 arrangements, clearance V grooves 4b may be machined into the ends of the vane slots 4a to give clearance for nesting the Y seals during full retraction of the vane and seals at top dead center. Small axial turbulence slots 4c may be machined into the periphery of the rotor 4 to aid in complete combustion. The slots 4c may be made in a herringbone or helical pattern on the rotor periphery if necessary for gas flow and turbulence purposes.

The rotor 4 width must exactly match the inside width of the stator housing 1, so that no pressure leakage occurs at either end. The machined finish of all these operating parts must be on the order of RMS 16 or better to maintain proper sealing.

The stator housing 1 wall is thick enough to be provided with multiple axial cooling holes 1c through the full width of the stator housing. Corresponding cooling holes are placed in both end plates 2 and 3 and the gasket 16 which exactly match the holes 1c in the housing to give full parallel fluid flow through the engine length.

The stator housing 1 may be fitted with mounting lugs which are not shown, or mounting may be accomplished by utilizing the end plates 2 and 3 and fastened to suitable support means with some of the machine screws 20. The distributor would consist of a modified I.C. engine type unit, arranged to fire all spark plugs simultaneously at all the multiple rotor positions. All elements of the standard ignition system are present to provide the required ignition efficiency. The distributor is driven directly from the rear extension of the drive shaft 7. The distributor cam would be phased with the rotor so that ignition occurs when the center of the compression cavity is coincident with the angular spark plugs positions.

Certain engine types and applications may require supercharging in which case the forced air would be brought into the multiple intake ports 13.

A fuel injection system would be adopted for most engine applications since the rotary engines lend themselves more readily to this arrangement, although a carburetor unit may be utilized for some applications.

The exhaust ports may be fitted with a powered blower system to aid efficiency and further reduce noxious combustion products. The blower system would usually be applied when a supercharging unit is employed, with both systems being optional, dependent upon the specific application.

A starter motor and ring gear drive would be coupled to the rear extension of the drive shaft 7. An alternator would also be belt connected to a pulley on the extension of shaft 7.

A standard fuel pump would be utilized to supply fuel for the engine carburetor system. Most of these standard units are not shown in the drawings nor itemized for the sake of specification clarity and because they are standard available stock units.

Some of the extra performance devices and additives which are applicable to reciprocating I.C. engines may be applied to this rotary engine. These devices are air flow needles, fuel and oil filters, fuel additives and the like.

The lubrication liner 1a and the lubrication discs 2a and 3a may be made from sintered bronze, or other porous, low friction material, finished to a smooth and true surface.

What is claimed is:

1. In a rotary internal combination engine, a stator housing containing a working cavity of one-half circular shape and one-half elliptical shape blended to form a continuous smooth internal surface, a multiple-slotted rotor in tangent contact with the said cavity at the minor axis of said one-half elliptical shape of said stator housing, multiple radially disposed slotted vanes closely fitted within the said slots of the said slotted rotor, interlocking plastic composition Y shaped sealing elements closely fitted into the slots of the said slotted vanes, two sealing end plates secured at each end of the said stator housing, intake and exhaust ports tangentially disposed at the lower juxtaposed quadrants of the said stator housing, a drive shaft secured to the center bore of the said slotted rotor, bearing means within said sealing end plates supporting said drive shaft and said slotted rotor.

2. The combination set forth in claim 1 including a thin porous low-friction lubrication liner secured to the said cavity of the said stator housing, thin porous low friction lubrication discs secured to the inside face of each of the said sealing end plates, a lubrication oil hole and groove distribution system within the said stator housing connecting to the said thin porous low-friction lubrication liner, an external oil reservoir to supply lubrication.

3. The combination set forth in claim 1 wherein the multiple radially disposed slotted vanes are provided with integral and symmetrical side protruding lips at the slotted end of the said vanes, interlocking rectangular sealing elements, secured within the said slots of the said slotted vanes.

4. The combination set forth in claim 1 including multiple radially disposed spark plugs secured to the said stator housing at near top dead center, spherical cavities within the said cavity disposed at the base of each of the said multiple spark plugs.

5. The combination set forth in claim 1 including multiple small axial turbulence slots uniformly disposed on the circumference of said slotted rotor between the multiple vane slots, V grooves at each of the said multiple slots on the circumference of said multiple-slotted rotor.

6. The combination set forth in claim 1 including additional interlocking plastic composition sealing strips disposed between the metal Y strips and the said interlocking rectangular sealing strips.

7. In a rotary internal combustion engine, a stator housing containing an oval shaped working cavity, a multiple slotted rotor in near tangent contact with the said oval cavity along the major axis of the said oval shaped working cavity, multiple radially disposed slotted vanes closely fitted within the said slots of the said multiple slotted rotor, interlocking Y shaped sealing elements closely fitted into the slots of the slotted vanes, two sealing end plates secured at each end of the said stator housing, intake and exhaust ports uniformly disposed at the lower juxtaposed quadrants of the said stator housing, a drive shaft secured in a center bore of the said slotted rotor, anti-friction bearing means within said sealing end plates supporting said drive shaft and said slotted rotor.

References Cited

UNITED STATES PATENTS

| | | | |
|---|---|---|---|
| 3,195,421 | 7/1965 | Rumsey et al. | 92—122 |
| 3,323,501 | 6/1967 | Balve | 123—16 |
| 3,249,096 | 3/1966 | Franceschini | 123—16 |
| 3,282,596 | 11/1966 | Wood et al. | 277—206 |

LEONARD H. GERIN, *Primary Examiner.*

U.S. Cl. X.R.

92—125; 277—81, 206